Figure 1:
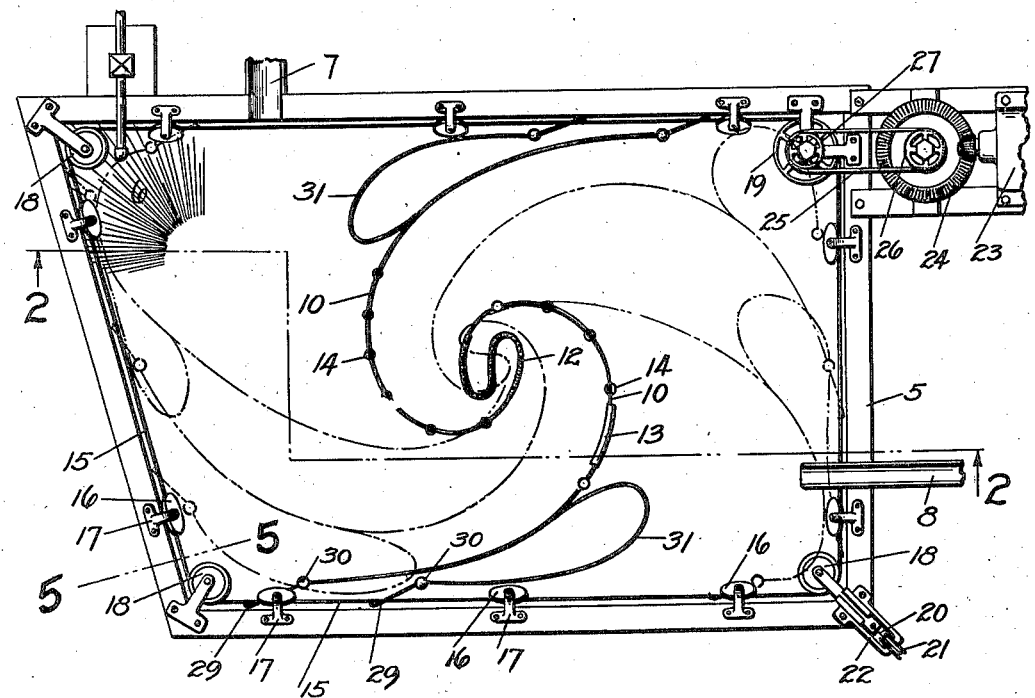

Nov. 29, 1927.  
H. S. COE  
THICKENER  
Filed March 9, 1926  
1,650,820  
2 Sheets-Sheet 1

INVENTOR.
H. S. Coe
BY
ATTORNEY.

Nov. 29, 1927.

H. S. COE 1,650,820

THICKENER

Filed March 9, 1926      2 Sheets-Sheet 2

INVENTOR.
H. S. Coe
BY
ATTORNEY.

Patented Nov. 29, 1927.

1,650,820

UNITED STATES PATENT OFFICE.

HARRISON S. COE, OF PALO ALTO, CALIFORNIA.

THICKENER.

Application filed March 9, 1926. Serial No. 93,479.

This invention relates to apparatus for the separation of solids in suspension, commonly known as "thickeners" and it concerns, more particularly, the appliances by which in the operation of the apparatus, the solids are moved to a point of discharge.

It is an object of the invention to provide in an appliance of the above mentioned character, a drag element and a therewith associated driving medium, by which the drag-action on solids in suspension or on solids settled to the bottom of the thickener tank, is extended over the entire area of the tank and to each point of the circumference thereof, irrespective of its superficial shape or size.

Another object of the invention is to provide to drag-element for thickeners adapted to automatically relieve itself from strains in the presence of an overload and consequent accumulation of settled solids.

A further aim of the invention is to provide a drag-mechanism of simple construction, capable of economic installation and devoid of bearings or of moving parts which might interfere with the removal of settled or settling solids by suction from any desired point near the bottom of the tank, and another object is to provide a drag or scraping mechanism adapted to be cleaned while in operation and capable of resisting undue strains without deformation or breakage of the parts of which it is composed.

Still another object of the invention is to provide a drag or scraping mechanism which, owing to the lightness of its component parts, minimizes the collection of refuse and deposits thereon, and an advantageous feature of the invention is that it will drag in off-center depressions of tanks of irregular form and thereby permit the efficient use of a discharge sump near a side or corner of the tank. Further objects of the invention relating mostly to details of construction and novel arrangements and combinations of parts, will fully appear in the course of the following description, made with reference to the accompanying drawings, in which like characters of reference designate corresponding parts throughout the several views and in which Figure 1 represents a plan view of a settling tank equipped with a drag mechanism constructed in accordance with the present invention and distinguished by the flexibility of the parts acting upon the solids for their removal to a point of discharge, Figure 2, a vertical section taken on the line 2—2, Figure 1, Figure 3, a modified plan view of a thickener tank, showing the provision in accordance with my invention, of a partially rigid scraping element for the removal of solids to the point of discharge, Figure 4, a vertical section along the line 4—4, Figure 3, Figure 5, an enlarged fragmentary section taken on the line 5—5, Figure 1, and Figure 6, a diagrammatic view showing two positions of a drag-member of the appliance, and one of the tow lines by which it is connected with the haulage element of the same.

Figure 2:
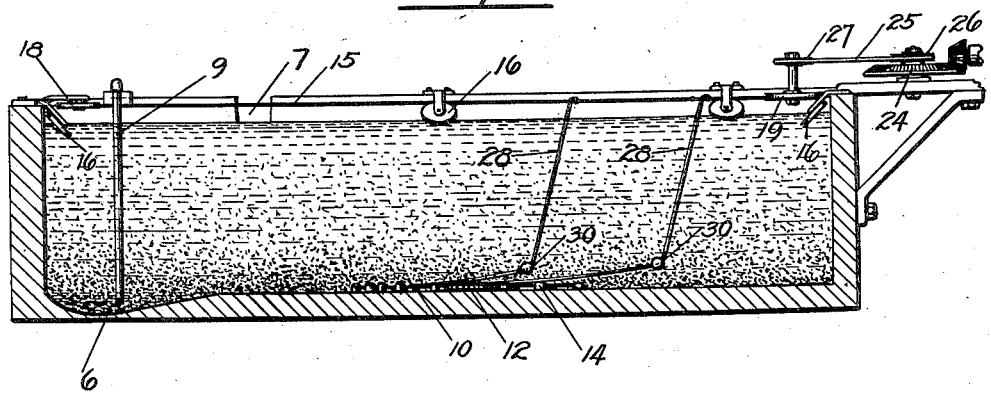

Referring first to Figures 1 and 2 of the drawings, the reference numeral 5 designates a tank of irregular form having near one of its sides a depression or sump 6 for the removal of settled or settling solids. An overflow trough 7 provides for the discharge of clear liquid, and the material is fed into the tank by means of a launder 8.

A conduit 9 having an intake-end above and in proximity to the sump, connects with a conveniently located pump or other suction device for removing thickened slimes upwardly from the interior of the tank.

The drag-element disposed on or near the bottom of the tank, comprises two or more flexible members 10 ranging from a central point of connection, in oppositely curving lines to the circumferential wall of the tank. The members are preferably made of cables connected by a comparatively short length of chain 12 to prevent kinking or breaking at the point at which they diverge in opposite directions to the sides of the tank. The cables may be encased in tubular sheaths 13 made of rubber or other flexible protective material to reduce wear and impairment from constant use, and they are provided at intervals with lugs 14 also made of rubber, to support them free from contact with the bottom surface of the tank.

The drag-element is connected at the outer ends of its members to a driving element adapted to move said ends in a path conforming with the settling area of the tank, circumferentially thereof, whereby the members of the element are compelled to traverse the entire settling area, irrespective of the shape or size thereof.

The driving element may consist of any suitable carrier adapted to the above described purpose, by movement in an endless course at the circumference of the tank, but it is preferred to employ a flexible haulage element movably mounted on the wall of the tank.

In the construction shown in the drawings, the haulage element comprises an endless chain or cable 15 movably supported for lengthwise travel upon a plurality of slanting sheaves 16 on brackets 17 projecting inwardly from the upper edges of the walls of the tank, and moving around guide sheaves 18 and 19 at the corners of the same.

The guide sheave 19 is of larger diameter than the others to serve as a drive pulley for the chain or cable by connection with an operating mechanism of suitable construction and arrangement, and one of the other sheaves 18 is slidably mounted for adjustment by means of a pull-rope 20 passing around a pulley 21 on a bracket 22 projecting exteriorly of the tank, for the purpose of tensioning the haulage cable to maintain the required frictional contact with the drive pulley.

The operating mechanism as shown in the drawings, comprises a motor 23, a speed-reduction gearing 24, and a chain 25 which connects a sprocket wheel 26 on the shaft of the driven gear-member with a corresponding wheel 27 on the shaft of the drive pulley.

The connection between the haulage element and the drag-element on the bottom of the tank is established through the medium of tow lines consisting of comparatively short rope or chain cables 28 which at their ends are connected to the haulage cable and to the diverging members of the drag-element at the outer ends thereof.

Figure 5:
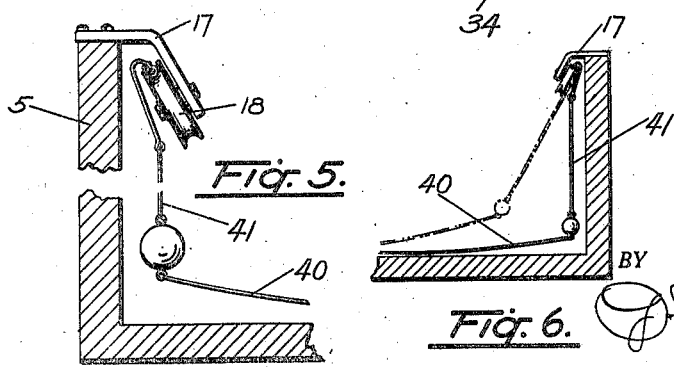
Figure 6:
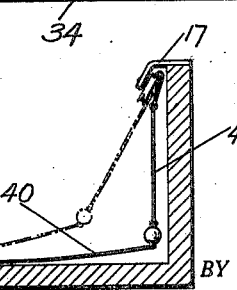

The connection between the tow lines and the haulage cable is made by means of hook-shaped devices 29 at the ends of the lines, provided with clamping appliances for their connection with the cable, it being apparent that in order to pass across the pulleys and guide sheaves of the haulage element, the fastenings must be capable of moving free thereof, as indicated in Figure 5.

The cables 28 are at their lower ends, attached to the drag-members by any suitable means and at the points of connection of the cables with the drag-element are weights 30 which in the operation function to hold the ends of the drag-members to the bottom of the tank, as will hereinafter be more fully explained.

The drag-element has in addition to its main-members 10, auxiliary drag-members 31 attached at one of their ends to the main-members and connected at their opposite extremities with the haulage-cable by tow-lines similar to those hereinbefore described.

The auxiliary drag-members insure the conveyance of solids close to the walls of the container; they extend to this end in loops between the main drag-members and the circumference of the tank, and they are weighted at their extremities in similar manner and for the same purpose as the drag-members to which they are attached.

In the operation of the apparatus, material is fed into the tank through the launder 8, and the haulage element is moved to travel lengthwise over its sheaves and pulleys in the direction of the arrows shown in Figure 1, by the operation of the power unit.

The movement of the haulage cable causes the members of the drag-element to move over the bottom surface of the tank, continually changing their form and position as their ends advance along the circumference of the tank, and thereby traversing the entire area of the bottom surface, irrespective of its shape or size.

Solids settling or settled in the tank are thus moved to the sump 6 which obviously is in the path of the drag-element, from where they are removed through the conduit 9 which, as stated hereinbefore, is connected with a conveniently located suction pump.

The clear water rising out of the solid suspension is discharged by the overflow 7.

The drag or scraping mechanism constructed and arranged as hereinabove described, is adapted for use under conditions where the majority of other appliances of similar purpose, at present in use, are inadequate or impractical. The self-adjusting flexible drag-element will, as stated hereinbefore, operate over the entire settling area of a thickener tank, irrespective of its size or shape and is therefore suitable for use in connection with very large tanks such as settlement basins for clarifying water in city supply systems.

It will function not only for the removal of solids settled to the bottom of the tank, but also for the conveyance of flocculent material, since the drag-action on such material causes it to mix with surrounding fluid to a state of suspension. The weighted flexible tow lines or connecting cables which connect the members of the drag-element to the haulage-element, normally hold the drag-element to the bottom of the tank and causes the parts at which they are attached to substantially follow the contour of the settling area.

If, however, the drag-element is subjected to unusual strain in case of overload, the weights of the connecting members are caused to swing back and upwardly, thereby lifting the extremities of the drag-members from the bottom of the tank. These conditions have been illustrated in Figure 6, in which the weighted end of one of the pendulum-like connecting members is shown in an elevated position, in which it has lifted the corresponding portion of the flexible drag-member.

It will be apparent that for the purpose of cleaning, repair or adjustment, both the suction pipe and the drag-members are readily raised above the liquid level without emptying the tank, and if necessary without discontinuation of the operation of the mechanism. In large tanks, this can be accomplished by means of a boat or float.

It will be further understood that owing to the flexibility of the various members and connections in the system, the drag-members may be adjusted to fit any form of tank and cover the entire area thereof.

It is to be understood that the drag element is flexible and constantly changes shape as it is moved around the tank. The members 10 are coiled to the greatest degree when the ends are at points closest to the center. When the ends are passing the remote corners, the flexible members 10 uncoil or straighten out so that the drag members will occupy at all times substantially the same position relative to the cables 28 and not be lifted high off the bottom surface of the tank when the cables 28 are drawn into the corners by the endless chain 15.

Figure 3:
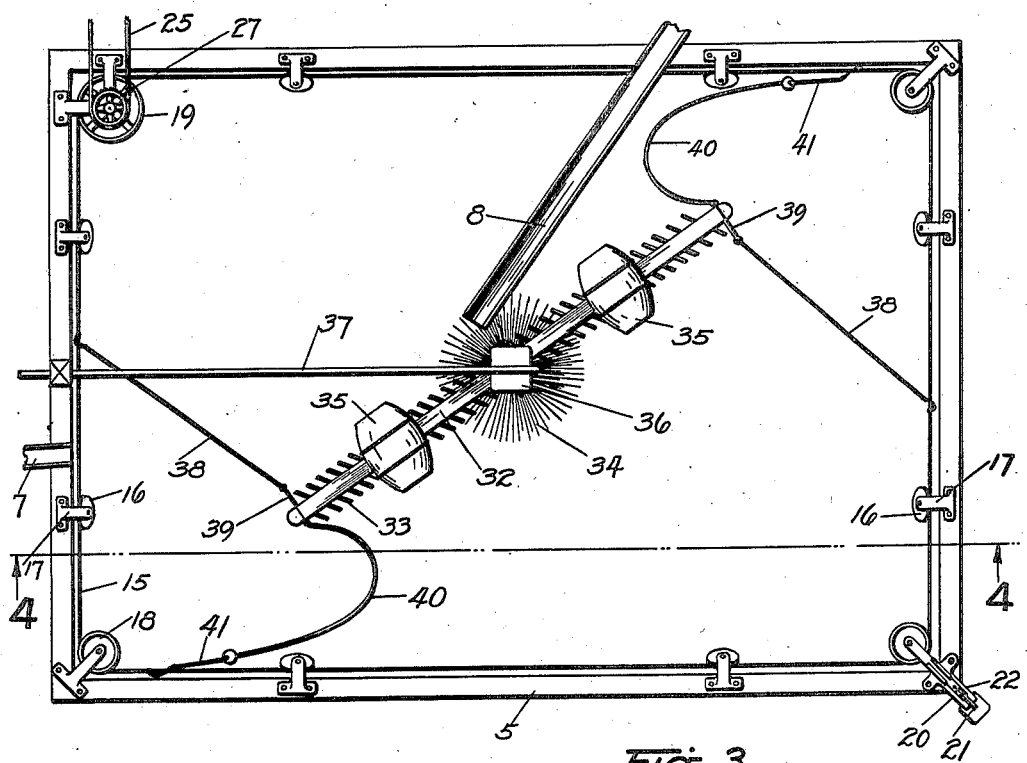
Figure 4:
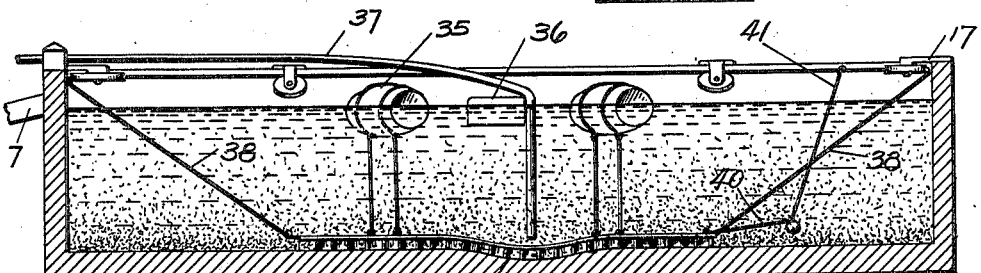

The construction illustrated in Figures 3 and 4 is distinguished from that hereinabove described, principally in the substitution of a substantially rigid scraping or raking unit for the major portion of the flexible drag-element, for the main purpose of moving sandy material positively toward a discharge opening.

The rigid element as shown, comprises a bar 32 provided with obliquely transverse blades 33 and bent in conformity with a central sump 34 in the bottom of the tank. The bar is suspended from floats 35 which aid in sustaining the weight thereof, and another float 36 is provided to support the discharge suction pipe 37 in superposed relation to the sump.

The haulage system is similar to that of the first described form of the invention, and its connection with the scraping-element is established by means of flexible tow lines 38 fastened to rigid arms 39 projecting laterally from the ends of the bar 32.

The spaces between the ends of the bar and the circumferential wall of the tank are in the operation, covered by auxiliary drag-members 40, functionally equivalent to the auxiliary members of the first described construction, the members being attached at the ends of the bar and connected at the lower ends of weighted flexible cables 41 attached to the haulage cable as before.

The auxiliary drag-members are sufficiently long to constantly remain in close proximity to the circumference of the settling area while following the movement of the raking unit, and it will thus be seen that as in the first described form of the invention, the entire settling area of a tank may be subjected to a scraping and dragging action, irrespective of the size or shape thereof.

In this form of the invention also, the flexible terminal portions of the drag-element will be lifted out of the settled solids to relieve strain caused by an overload, by the weighted cables which connect them with the haulage-element.

What I claim and desire to secure by Letters Patent is:

1. In settling apparatus, a tank having a settling area, a drag-element for the movement of solids over said area and extending substantially to the circumference thereof, a driving element travelling circumferentially of the area and a tow-line suspended from the driving element, in connection with the drag-element.

2. In settling apparatus, a tank having a settling area, a drag-element for the movement of solids over said area and extending substantially to the circumference thereof, a driving element travelling circumferentially of the area, and a weighted tow-line suspended from the driving element, in connection with the drag-element.

3. In settling apparatus, a tank having a settling area, a driving element travelling circumferentially of said area, a drag-member for the movement of solids over the area, in movable connection with the driving-element, and an auxiliary flexible drag-member in flexible connection with the driving element.

4. In settling apparatus, a tank having a settling area, a driving element travelling circumferentially of said area, a flexible drag-member for the movement of solids over the area, and a connection to effect the movement of the drag-member in a path determined by the movement of the driving element.

5. In settling apparatus, a tank having a settling area, a driving element travelling circumferentially of said area, and a drag-element in flexible connection with the driving element and having spaced members for its support on the bottom of the tank.

6. In settling apparatus, a tank having a settling area, a flexible drag-element for the movement of solids over said area, and a driving-element for the movement of the drag-element in a path determined by the circumference of the area.

7. In settling apparatus, a tank having a settling area, a drag-member for moving solids over said area, having a weighted flexible extremity, and a driving element for the movement of said extremity in a path determined by the circumference of the area.

8. In settling apparatus, a tank having a settling area, a driving element travelling circumferentially of said area, and a drag-element having diverging flexible members connected at their ends to the driving-element.

9. In settling apparatus, a tank having a settling area, a driving element travelling circumferentially of said area, a drag-element having diverging flexible members connected at their ends to the driving-element, and auxiliary flexible members associated with the other members, in connection with the driving element.

10. In settling apparatus, a tank having a settling area, a drag-element for moving solids over said area, and a driving-element in connection with the drag-element, comprising an endless cable mounted to travel circumferentially of the area, and mechanism for the movement of the cable.

11. In settling apparatus, a tank having a settling area, a drag-element for moving solids over said area, and a driving-element in connection with the drag-element, comprising an endless cable mounted to travel circumferentially of the area, a drive-wheel engaged by the cable, and a power-unit in operative relation to the drive-wheel.

12. In settling apparatus, a tank having a settling area, a drag-element for moving solids over said area, and a driving-element in connection with the drag-element, comprising sheaves on the tank circumferentially of the area, an endless cable supported on the sheaves, a tensioning device for the cable and mechanism for the movement of the cable.

In testimony whereof, I have hereunto affixed my signature.

HARRISON S. COE.